United States Patent [19]

Treger

[11] Patent Number: 5,543,246
[45] Date of Patent: Aug. 6, 1996

[54] BATTERY TESTER ADHESIVE SYSTEM

[75] Inventor: Jack Treger, Milton, Mass.

[73] Assignee: Duracell Inc., Bethel, Conn.

[21] Appl. No.: 389,363

[22] Filed: Feb. 16, 1995

Related U.S. Application Data

[63] Continuation-in-part of Ser. No. 116,383, Sep. 2, 1993, abandoned.

[51] Int. Cl.⁶ ............................................... H01M 10/48
[52] U.S. Cl. ..................... 429/90; 429/93; 429/170; 429/178; 324/345; 359/44; 359/82; 359/89
[58] Field of Search ............................ 429/90, 93, 170, 429/178; 350/351; 324/345

[56] References Cited

U.S. PATENT DOCUMENTS 5,059,895  10/1991  Cataldi et al. ........................ 324/104
5,084,107  1/1992  Deguchi et al. ........................ 136/256

FOREIGN PATENT DOCUMENTS 57-119457  7/1982  Japan.
2269272  5/1994  United Kingdom.

*Primary Examiner*—M. Nuzzolillo
*Attorney, Agent, or Firm*—Ronald S. Cornell; Barry D. Josephs; Robert F. Feltovic

[57] ABSTRACT

A system for bonding a condition indicator to an electrochemical cell is disclosed. The system employs an electrically conductive adhesive which bonds the indicator to a terminal of the cell. The terminal contact surface for the adhesive is desirably of tin. The adhesive contains metallic flakes and is preferably a thermally activated polyesterpolyurethane adhesive or a thermosetting adhesive containing acrylate monomers.

13 Claims, 1 Drawing Sheet

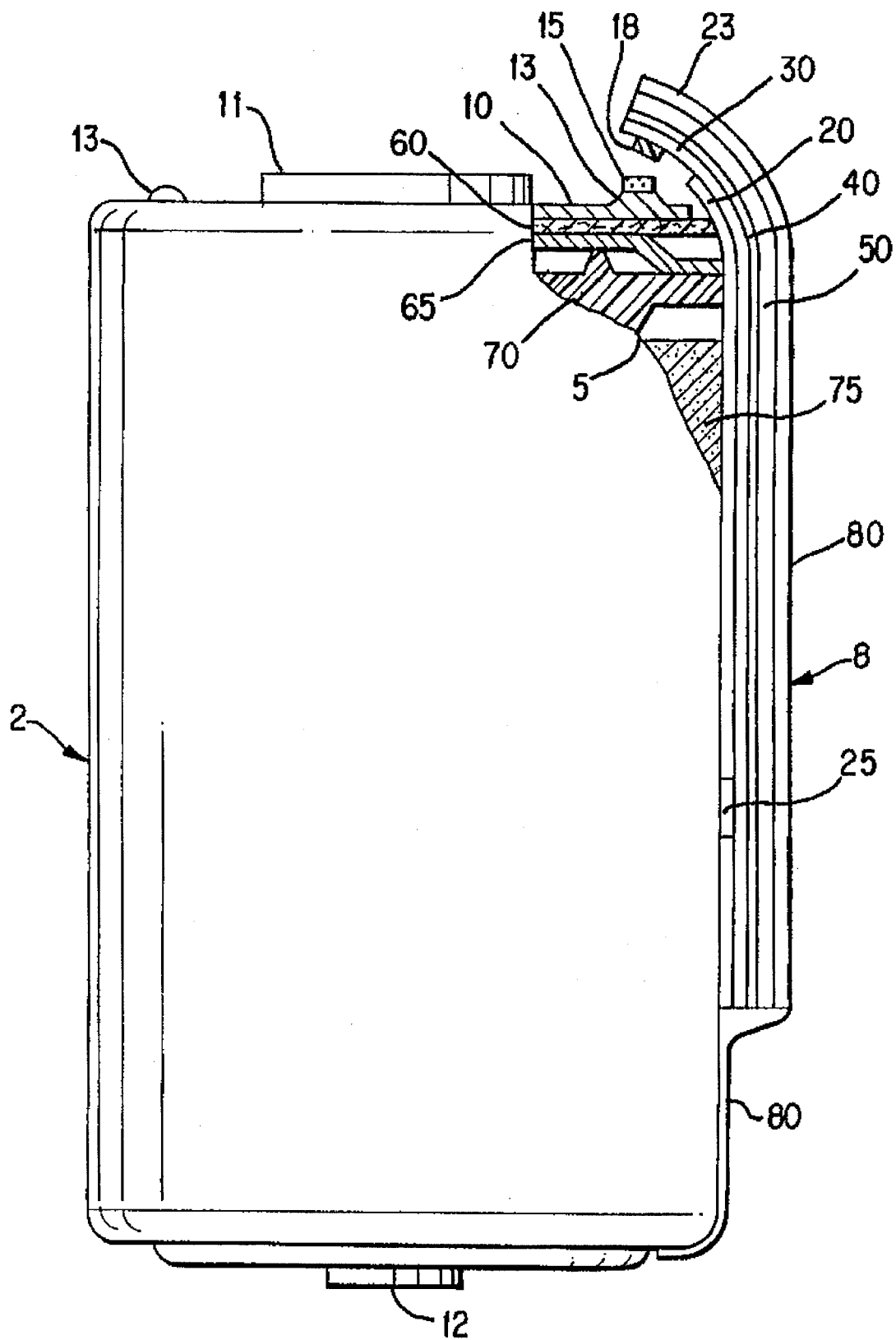

BATTERY TESTER ADHESIVE SYSTEM

This is a continuation-in-part of patent application Ser. No. 08/116,383 filed Sep. 2, 1993, now abandoned.

The invention relates to an electrically conductive adhesive system for securing a condition indicator to a terminal end of an electrochemical cell.

There has been a long-standing need to develop a workable cell condition indicator which may be affixed to the cell at the time of cell manufacture. Such indicators may be referred to herein as "on-cell condition indicators." One type of condition indicator proposed in the prior art as suitable for use as an on-cell indicator is a thermochromic condition indicator. This type of indicator is typically in the form of a film-laminate containing a material which is responsive to heat to become colorless or change color when heated by an adjacent resistive element, which is connected to the terminals of a cell. Depending on the cell voltage a color change will occur to alert the user when it is time to replace the cell. These indicators normally require that at least one end of the resistive layer be permanently secured to one of the cell's terminals. In order to activate and use the indicator the user manually presses the non-secured end of the resistive layer into electrical contact with the other cell terminal.

To date, however, on-cell condition indicators have not been commercialized. Mechanical devices, for example, screws or pressure contact devices for securing the resistive layer of the indicator to one of the cell's terminals have proved inadequate, cumbersome or else too time consuming to install. Also, it has been difficult to find a suitable means for permanently securing the resistive layer to the cell's terminal or terminal end cap without significantly increasing the resistance of the indicator, thus impairing its operation. A solution to this problem has been made more difficult since the terminal end caps in conventional alkaline cells are normally formed of nickel plated steel. The nickel plating is commonly employed to protect the steel from corrosion. The nickel plated steel, however, has a tendency to reduce conductivity at the adhesive interface, especially when the cell is exposed to elevated ambient temperatures and high humidity.

The above described contact problems apply as well to other types of on-cell indicators such as electrochromic and electrochemical indicators which require that at least one portion of the indicator be permanently secured to a cell terminal.

Accordingly it is an object of the present invention to provide an electrically conductive adhesive system for permanently securing at least a portion of a cell condition indicator to a terminal of an electrochemical cell.

It has been determined that a tin contact surface for an electrically conductive adhesive permits attainment and maintenance of high conductivity between the adhesive and contact surface even though the adhesive and contact surface are exposed to elevated temperature and high humidity conditions and an urban environment containing sulfurous gases.

The invention will be better understood with reference to the drawing:

BRIEF DESCRIPTION OF THE DRAWING

The drawing shows an on-cell condition indicator affixed to a terminal of an electrochemical cell employing electrically conductive adhesive. (The condition indicator is shown enlarged.)

DETAILED DESCRIPTION

A thermochromic condition indicator 8 is secured to an electrochemical cell 2. By way of example, cell 2 is a conventional alkaline cell comprising a steel casing 5, a positive terminal 12, and a negative end cap 10 having a central negative terminal contact portion 11. Positive terminal 12 comprises the end portion of casing 5. The negative end cap 10 may be housed within a plastic grommet 70 and is insulated from contact with the casing 5 by suitable means such as cardboard insulating disk 60. A metal support disk 65 may be inserted between grommet 70 and insulating disk 60. Cathode active material 75, typically manganese dioxide, is shown below grommet 70.

In one embodiment, negative end cap 10 is provided with a bulge 13 protruding from its exposed surface. Preferably the bulge is circumferential thus forming a slightly protruding ring around the surface of end cap 10. The protruding continuous or discontinuous circumferential bulge 13 may be located between the negative terminal 11 and the peripheral edge of end cap 10. Conductive adhesive 15 may be applied directly to circumferential bulge 13 either as a dab onto a portion of the bulge or coated over its entire circumference. All or a portion of the conductive adhesive will thus be elevated somewhat from the remaining surface of end cap 10. This elevation facilitates positive contact between loose end 23 of indicator 8 as the loose end is pressed into contact with adhesive 15. In conventional practice, the end cap 10 may be formed of steel which may have a surface plating with another metal thereon. In order to assure proper operation of the on cell condition indicator 8 it has been determined that the total adhesive resistance be less than 0.1 ohm even when the adhesive bonded to the contact surface 13 is stored for one month at 60° C. and 100% relative humidity. The total adhesive resistance (also referred to herein as the bond resistance) is defined as the resistance between the outer surface of the adhesive and the contact surface, e.g. surface 13, including the interfacial resistance between the adhesive and the contact surface. The total resistances reported in the examples and tables are based on use of a dab of adhesive having a cross-sectional surface area of about 1 sq. mm perendicular to current flow and a thickness of about 2 mil (0.05 mm) in the direction of current flow. It has been determined that a contact surface, e.g. surface 13, of nickel or cobalt gives satisfactory initial total resistance of less than 0.1 ohms with adhesive 15, but upon one month's storage at 60° C. and 100% relative humidity the resistance rises to an unacceptable level of above 0.1 ohm.

A contact surface 13 of silver, brass, or copper with adhesive 15 bonded thereto has been determined to provide a satisfactory total resistance of less than 0.1 ohm both initially and after one month's storage at 60° C. and 100% relative humidity. However, silver, brass and copper have been found to have the disadvantage that they tend to tarnish when exposed to harsh urban environments containing sulfurous gases such as $H_2S$ and $SO_2$. This detracts from the aesthetic appearance of the cell and can also increase the interfacial resistance with time. It has been discovered that a cell contact surface 13 of tin is the most desirable contact surface for the conductive adhesive because tin when bonded to conductive adhesive 15 yields a total resistance of less than the required 0.1 ohms even after one month's storage at 60° C. and 100% relative humidity and additionally does not tarnish when exposed to harsh urban environments containing sulfurous gases. The tin contact surface is conveniently produced by plating it onto steel.

In a specific embodiment an on-cell condition indicator 8 is shown positioned against casing 5, which may be of nickel plated steel. Condition indicator 8 is a film-laminate of the thermochromic type comprising a thermochromic layer 50 on its outside surface and an electrically resistive layer 30 on its inside surface. Condition indicator 8 is a thin structure of thickness less than 100 mils (2.5 mm), preferably between 4 and 15 mils (0.1 and 0.38 mm). Resistive layer 30 may be any conductive metal that does not significantly oxidize. Preferably it is an ink containing silver or silver plated nickel. Thermochromic layer 50 may be separated from resistive layer 30 by a polymeric film 40. Film 40 is typically a high temperature stable, transparent film such as a polyester, polycarbonate or nylon enforced cellulose. Film 40 serves as a support substrate onto which either or both layers 30 and 50 may be coated and also serves to conduct heat from resistive layer 30 to thermochromic layer 50. Indicator 8 may also comprise an insulating layer 20, for example paper, located against casing 5 and between casing 5 and resistive layer 30. Insulating layer 20 may have a cutout portion 25 to enable resistive layer 30 to be pressed into contact with casing 5 (in the area of cutout 25) when it is desired to determine the condition of cell 2.

During assembly, indicator 8 may be applied to cell 2 with insulating layer 20 contacting casing 5 as shown in FIG. 1. Conventional adhesive (not shown) may be used to secure the body of insulating layer 20 to casing 5. Alternatively, it is possible to secure indicator 8 on a cell without adhering it thereto. This may be accomplished by the pressure of a film-label 80 which is heat shrunk over indicator 8 and around the surface of casing 5. However, to secure end 23 of indicator 8 to end cap 10, various conductive adhesives can be employed in such a way that good electrical contact is maintained. The conductive adhesives, for example may be thermally activated. In this case a dab of adhesive 15 may be applied to end cap 10. Adhesive 15 may be applied directly onto any portion of the exposed surface of end cap 10. However, in the preferred embodiment wherein end cap 10 includes a raised portion or bulge 13 on its surface, more preferably in the form of a circumferential bulge, the conductive adhesive 15 is applied directly onto the bulge. Conductive adhesive 15 is preferably applied as one small dab anywhere along the surface of bulge 13. However adhesive 15 may be applied as dabs to different regions along the circumference of bulge 13 or alternatively adhesive 15 may be coated over the entire circumferential surface of bulge 13. In this latter case the surface to be bonded, e.g. layer 30 is widened or fanned out at the bonding sight so that it covers all of the conductive adhesive as resistive layer 30 is pressed onto circumferential bulge 13.

If adhesive 15 is solvent based, the adhesive dab is first dried to evaporate solvent. Loose end 23 may then be pressed onto adhesive dab 15 with a hot platen which activates the adhesive causing it to become tacky. On cooling a permanent bond is created. If a higher strength bond is desired, another dab of thermally activated adhesive (adhesive 18) may be applied to the underside of loose end 23 before it is brought into contact with adhesive 15. After drying, the two dabs of adhesive are pressed into contact by pressing loose end 23 against negative end cap 10. A hot platen may be simultaneously applied to the indicator 8 in the region of the conductive adhesive to tackify the adhesive. Upon cooling, a high strength permanent bond is created between loose end 23 and end cap 10.

Other types of conductive adhesives may be employed. For example, the adhesive may be thermosetting. With this type of adhesive a monomer mixture containing conductive particles (part A) may first be applied to the end cap as shown at 15 and an activator (part B) may be applied to the loose end 23 of the indicator as shown at 18. Conversely, the monomer mixture may be applied to one side and the activator to the other. The thermosetting adhesive polymerizes and crosslinks as the monomer mixture and activator come together. Thus, as loose end 23 is pressed onto end cap 10, the monomer and activator come into contact causing the adhesive to set quickly and produce a strong permanent bond. After the adhesive is applied and the loose end 23 secured to end cap 10 a conventional polymer film label (not shown), for example, of the type described in U.S. Pat. No. 4,608,323 may be applied over both cell casing 5 and indicator 8. The film label may then be heat shrunk over the casing and indicator. Alternatively, indicator 8 may first be secured to the inside surface of the film label and the label with indicator 8 affixed thereto applied against casing 5. In this latter case the conductive adhesive would be applied as above described. If the conductive adhesive is of the thermally activated type, a hot platen may then be applied to the outside surface of the label at end 23, whereupon end 23 becomes bonded to end cap 10.

The conductive adhesive for bonding on-cell condition indicators to a cell terminal should satisfy a number of physical property requirements. The adhesive must be electrically conductive. The amount and thickness of the adhesive dab 15 can be adjusted somewhat, but from a practical standpoint the dab of adhesive desirably has a cross-sectional surface area of about 1 sq. mm perpendicular to current flow and a thickness of about 2 mil (0.05 mm) in the direction of current flow. The total resistance between adhesive 15 and contact surface 13 (including interfacial resistance) should be less than about 0.1 ohm, both initially and even after one month's storage at elevated environmental temperature and humidity. The total resistance of the adhesive (including interfacial resistance) may advantageously be between about 0.001 and 0.1 ohms. The adhesive should be readily coatable onto the surface of the endcap 10 or underside of the indicator 8. The adhesive should have a tackification time of less than about 5 seconds so that it can be used in a mass production assembly operation for affixing the indicator to the cell. If a thermosetting adhesive is employed a setting time of less than about 60 seconds to develop a bond strength of at least 100 psi is preferred. The adhesive should have a bonding strength of at least 100 psi, typically between about 100 and 1000 psi. The adhesive should not degrade or adversely harm the indicator or film-label or other protective layer applied thereover. In particular, if a label or other protective layer covering the indicator contains a plasticizer, the adhesive should be resistant to chemical attack by the plasticizer. Furthermore the adhesive bond between the indicator and cell end-cap should withstand environmental heat and humidity tests. For example, the adhesive bond should withstand a temperature of about 60° C. for about one month's duration as well as a temperature of about 60° C. in combination with a humidity of about 100% for one month's duration. This requirement is made more difficult to satisfy, since after adhesive contact is formed, there is no external force other than the pressure of the label applied to indicator 8 to hold it against the contact surface on end cap 10. The adhesive should also have sufficiently low viscosity during the affixing step. This will enable the two surfaces to have close contact with each other whereby reduced contact resistance is obtained. A contact surface of tin on end cap 10 to which the conductive adhesive is applied has been discovered to be the most desirable in the context of the present application, since it not only permits maintenance of a high level of interfacial conductivity with the conductive adhesive, but also does not tarnish especially when left exposed to harsh urban environments containing sulfurous gases such as $SO_2$ and/or $H_2S$.

Applicant has determined that the addition of silver flakes to quickly tackifying or quickly setting adhesives producing bond strengths of at least 100 psi can be used advantageously to produce a conductive adhesive for on-cell condition indicators. Although silver powders may be employed, it has been determined that silver flakes, particularly silver flakes formed from mechanically flattened silver powders produce higher conductivity and are therefore preferred. It has been determined that silver flakes between about 5 and 100 microns render quickly setting or quickly tackifying adhesives sufficiently conductive and coatable that the adhesive may be employed to bond an on-cell condition indicator to a cell terminal. However, silver flakes having an average diameter between about 5 and 20 microns, typically between about 5 and 15 microns, are even more compatible with quickly setting or quickly tackifying adhesives. The silver flakes produce a preferred adhesive having a desirable resistivity of less than $2.0 \times 10^{-4}$ ohm-m, typically between about $2.0 \times 10^{-4}$ and $2.0 \times 10^{-5}$ ohm-m. (Silver flakes of average diameter greater than 100 microns interfere with the coatability of the adhesive and average diameters less than about 5 micron do not produce the desired level of conductivity at a given concentration.) The flakes are characterized by having an average diameter to thickness ratio greater than 10, typically between 10 and 1000. (The diameter is herein defined as the maximum diameter or maximum length of the particle, whichever is greater.) The silver flakes advantageously comprise between 40 and 90 percent by weight of the adhesive (dry basis). When the silver flakes comprise less than 40 percent by weight of the adhesive (dry basis), the resistivity becomes greater than $2.0 \times 10^{-4}$ ohm-m. When the silver flakes are greater than 90 percent by weight of the adhesive (dry basis) the resistivity may become less than $2.0 \times 10^{-5}$ ohm-m, but the adhesive develops insufficient bond strength.

Although silver flakes are preferred, other electrically conductive particles can also be employed. For example, the conductive particles may be formed by electrolytically plating silver onto conductive particulate substrates. Such substrates onto which silver may be plated may be conductive metallic particles, for example, nickel or copper or conductive non-metallic particles of carbon or graphite. Alternative conductive particles may be formed by plating silver onto non-conductive particulate substrates by non-electrolytic plating techniques. Such non-conductive substrates onto which silver may be plated may be selected from plastic materials which can readily be micronized to particle size less than 100 micron and preferably flattened into flakes having a diameter to thickness ratio greater than 10, typically between about 10 and 1000. (The diameter is herein defined as the maximum width or maximum length of the particle, whichever is greater.) Suitable plastic materials onto which silver may be plated, for example, may be polypropylene, nylon, polyesters, polyurethane, and polyacrylates. Instead of employing silver or silver plated particles, the conductive particles may be composed of noble metals or other highly conductive non-corrosive metals. Such metals include gold, palladium, platinum, iridium, rhodium, and ruthenium.

In one preferred embodiment the conductive adhesive satisfying the above described properties may be a thermally activated thermoplastic adhesive. A preferred conductive adhesive of this type contains a thermally activated aromatic polyesterpolyurethane resin. The polymer undergoes a reversible crystalline to amorphous phase change rendering it tacky at a threshold elevated temperature. Upon cooling the crystalline phase reforms and the adhesive bond develops. The adhesive may be prepared by mixing the polyester/polyurethane resin in appropriate solvent together with conductive particles and a corrosion inhibitor. A suitable polyurethane resin already in solvent is available under the trade designation aromatic polyester polyurethane QA3781 from K.J. Quinn & Co. This is a solvated blend containing 40% solids in toluene and methyl ethyl ketone. Additional high boiling solvents, for example diethylene glycol diacetate, is desirably added to retard evaporation of the adhesive mixture prior to application. The conductive particles may be selected from the trademarked SILFLAKE series of silver powders from Technic Inc. The preferred silver powders have an average particle size typically between about 5 and 15 microns in diameter. The corrosion inhibitor may be strontium chromate, zinc phosphate or zinc powder. If it is zinc powder, then the particle size is desirably 1–100 microns, preferably 5–10 microns. The blended adhesive typically has a viscosity between about 5000 and 100,000 centipoise so that it may be conveniently applied at its point of intended use using conventional gravure, flexographic, reverse roller, silkscreen, stamping, or syringe pump techniques.

A preferred formulation of the polyurethane thermally activated adhesive is set forth in the following Table 1.

TABLE 1

|  | Wet Basis Parts by Weight |
|---|---|
| Conductive Material: | |
| Conductive silver flakes (SILFLAKES 135) | 67.4 |
| Adhesive Resin: | |
| Aromatic polyester polyurethane solids | 6.4 |
| Solvents: | |
| Methyl Ethyl Ketone | 4.8 |
| Toluene | 4.8 |
| Diethylene glycol diacetate (high boiling) | 16.0 |
| Corrosion Inhibitor: | |
| Strontium Chromate | 0.6 |

In another embodiment the conductive adhesive may be an activated thermosetting adhesive; preferably a conductive acrylate adhesive formed from momomer mixture containing at least one acrylate monomer. Such adhesives may be formulated in two parts. Part A contains an acrylate monomer mixture and part B the activator. The adhesive polymerizes and crosslinks when the activator (part B) is applied to the monomer mix (part A). The monomer mix may typically comprise a urethane acrylate monomer, e.g. SARTOMER 9504 monomer (Sartomer Co.) to provide flexibility, and other monomers which promote adhesion. Typical adhesion promoting monomers are hydroxyethyl methacrylate, methacrylic acid, and 10-methacryloyloxy decyldihydrogen phosphate. A crosslinking monomer may be added such as trimethylolpropane trimethacrylate available as SARTOMER 350 monomer from the Sartomer Co. A thickening agent such as fumed silica may be added to control viscosity, typically to between about 500 and 5000 centipoise. A suitable crosslinking catalyst such as t-butyl perbenzoate may be added. Conductive particles, preferably a silver powder selected from the SILFLAKE series (average particle diameter between about 5 and 15 microns), are added to the mixture.

The activator (part B) may be a butyraldehyde-amine condensation product available under the trade designation VANAX 808 from the R.T. Vanderbilt Company.

A preferred formulation for the conductive thermosetting adhesive is set forth in Table 2. (Parts A and B may typically be employed in 1:1 ratio.)

TABLE 2

|  | Parts by Weight |
|---|---|
| Part A: | |
| Monomers: | |
| Urethane diacrylate (SARTOMER 9504) | 15.0 |
| Hydroxy ethyl methacrylate | 15.0 |
| Methacrylic acid | 2.5 |
| trimethylolpropanetrimethacrylate (SARTOMER 350) | 2.5 |
| 10-methacryloyloxydecyldihydrogen-phosphate | 12.0 |
| Thixotropic Agent: | |
| Fumed Silica (CAB-O-SIL EH5) | 1.5 |
| Crosslinking Catalyst: | |
| t-butyl perbenzoate | 1.5 |
| Conductive Material: | |
| Conductive Silver Flakes (SILFLAKES 135)[1] | 50.0 |
| Part B: | |
| Butyraldehyde-amine condensation product (VANAX 808) | 100.0 |

Notes:
[1]Cabot. Corp.

The following examples will illustrate the application of the conductive adhesive to an on-cell condition indicator (All parts and percents are by weight.):

EXAMPLE 1

A conductive thermally activated adhesive is prepared by first formulating a solution having the composition shown in Table 1. The solution is prepared by first adding 16 parts of a polyurethane solution (QA3781 from K.J. Quinn & Co.) to a conventional mechanical mixer. (The polyurethane solution QA3781 contains 6.4 parts polyurethane, 4.8 parts methyl ethyl ketone and 4.8 parts toluene). Next, 16 parts of diethylene glycol diacetate is added and the mixture is blended at ambient temperature for several minutes until a homogeneous solution is produced. Then, a total of 67.4 parts of the silver flakes (SILFLAKES 135) is added in two or three increments and the mixture blended at ambient temperature for about a minute each increment. Finally, 0.6 parts of strontium chromate is added and the mixture blended at ambient temperature for about 5 minutes more or until a homogeneous mixture is obtained. The mixture can be stored in a closed vessel at ambient conditions. It has a viscosity of about 30,000 centipoise.

A dab 15 which in practice may vary from 10–50 microliter of the mixture is manually applied onto bulge 13 of end cap 10. End cap 10 and bulge 13 are of nickel plated steel so that dab 15 of the mixture is contacts the nickel plate. Dab 15 is dried at 60° C. for 60 minutes resulting in a non-tacky product having a cross-sectional surface area perpendicular to current flow of about 1 sq. mm and thickness in the direction to current flow of about 2 mil (0.05 mm). Contact is made directly or indirectly at the ends of resistive layer 30. In this example, free end 23 of indicator 8 is manually pressed onto dab 15 so that a portion of exposed resistive layer 30 is pressed into contact with dab 15. A film 80 of polyvinylchloride which may form the label of a commercial electrochemical cell is wrapped around the exposed surface of indicator 8. A hot platen having a surface temperature of about 110° C. is applied over that portion of film 80 directly over dab 15. The hot platen is applied for about 1–3 seconds at a pressure of about 1 to 5 psi whereupon dab 15 immediately tackifies and bonds resistive layer 30 to end cap 10. As dab 15 cools, an adhesive bond of at least 100 psi (specifically 110–130 psi as measured by test method ASTM 3528) is developed between end cap 10 and resistive layer 30. The initial total resistance of the bond (including interfacial resistance) measured as 0.05 ohms using a four point resistive bridge with a test current of 1 amp. Thus, the initial resistance of the bond measured satisfactorily, i.e. less than 0.1 ohm.

The adhesive bond is then subjected to an environmental test wherein it is exposed to a temperature of 60° C. at 100% relative humidity for one month. The resistance of the bond at the end of one month in the this test rises to above 0.1 ohm. Since the total resistance of the bond exceeds the desirable level of 0.1 ohm, the nickel plated steel contact surface is determined to be an unacceptable contact surface for connecting a condition indicator to a commercial cell.

EXAMPLE 2

A conductive thermosetting adhesive is prepared by first forming Part A by adding the monomers listed in Table 2 to a conventional mixer. The monomers are added to the mixer in the percent by weight given in Table 2. All other components are added in the percent by weight shown in Table 2. The mixture is stirred under ambient conditions until homogeneity is achieved. Then the SILFLAKES 135 is mixed in followed by the t-butyl perbenzoate catalyst. Mixing is continued. When homogeneity is obtained, the CAB-0-SIL fumed silica is added and blended in until the mixture thickens to a homogeneous thixotropic paste (Part A).

When it is desired to apply the adhesive, the Part A mixture is applied as dab 15 to bulge 13 of end cap 10 (1 sq. mm in area and 2 mil (0.05 mm) thick). End cap 10 and bulge 13 are of nickel plated steel and Part A contacts the the nickel plate. Part B, which is low viscosity crosslinking activator VANAX 808, is applied as dab 18 (1 sq. mm) to the underside of resistive layer 30. (Conversely, Part A may be applied as dab 18 and Part B as 15.) In this example dab 15 and 18 are applied covering about 1 sq. mm surface area using a syringe pump applicator. (In commercial practice they may be applied using conventional gravure, flexographic, reverse roller or silkscreen printing, stamping, or syringe pump techniques.) The two coated surfaces are then pressed together using only moderate pressure whereupon the adhesive is formed and sets in about 1 to 2 minutes. The set adhesive has a thickness of about 2 mils (0.05 mm) and covers a surface area of about 1 sq.mm. Full bonding strength is obtained in about 24 hours. At this time a bond strength of at least 50 psi (specifically, 60–70 psi as measured by the ASTM 3528 method) develops between end cap 10 and resistive layer 30.

Initially the adhesive has a measured total resistance (including interfacial resistance) of 0.05 to 0.1 ohms. The adhesive bond is subjected to the same environmental test as described in Example 1. Upon storage for one month at 60° C. and 100% relative humidity, the total resistance of the bond rises to above 0.1 ohm, again indicating that a nickel plated steel is an unacceptable surface for electrically connecting a condition indicator to a cell.

EXAMPLE 3

A dab 15 of the same adhesive in composition and amount as described in Example 1 is prepared and applied to bulge 13 of end cap 10. However, bulge 13 and end cap 10 are composed of steel plated with copper which in turn is plated with silver. The adhesive in this example is applied to the exposed silver plated layer on bulge 13 of cell 2. The adhesive is dried and the free end 23 of indicator 8 is manually pressed onto dab 15 as described in Example 1. A film 80 of polyvinylchloride which may form the label of a commercial cell is wrapped around the exposed surface of indicator 8 and a hot platen is applied as in Example 1, whereupon dab 15 immediately tackifies and bonds resistive layer 30 to end cap 10. As dab 15 cools an adhesive bond of at least 100 psi is developed. Initially the total resistance of the bond measures as less than 0.001 ohms using a four point resistive bridge with a test current of 1 amp.

The adhesive bond is subjected to the same environmental test as described in Example 1. The bond's total resistance did not rise above 0.001 ohms at any time during the test. Although the bond's resistance remains below the required 0.1 ohm level, the silver contact surface of this example gradually tarnishes when exposed to a harsh urban environment containing $H_2S$ and $SO_2$ gases. The tarnishing detracts from the aesthetic appearance of the cell and can cause the total bond resistance to rise to unacceptable levels over time. Thus silver is an unacceptable cell contact surface for electrically connecting a condition indicator thereto.

EXAMPLE 4

A dab 15 of the same adhesive in composition and amount as described in Example 1 is prepared and applied to bulge 13 of end cap 10. However, bulge 13 and end cap 10 are composed of a) copper or b) steel plated with copper. The adhesive in this example is applied to the bulge 13 for each case a) and b) so that the adhesive contacts the exposed copper layer. The adhesive is dried and the free end 23 of indicator 8 is manually pressed onto dab 15 as described in Example 1. A film 80 of polyvinylchloride which may form the label of a commercial cell is wrapped around the exposed surface of indicator 8 and a hot platen is applied as in Example 1, whereupon dab 15 immediately tackifies and bonds resistive layer 30 to end cap 10. As dab 15 cools an adhesive bond of at least 100 psi is developed. Initially the total resistance of the bond (including interfacial resistance) in each case a) and b) measures 0.001 ohms using a four point resistive bridge with a test current of 1 amp.

The adhesive bond is subjected to the same environmental test as described in Example 1. The bond's total resistance did not rise above 0.002 ohms at any time during the test. The bond's total resistance did not rise above 0.002 ohms at any time during the test. Although the bond's resistance remains below the required 0.1 ohm level, the copper contact surface of this example gradually tarnishes when exposed to a harsh urban environment containing $H_2S$ and $SO_2$ gases. The tarnishing detracts from the aesthetic appearance of the cell and can cause the total bond resistance to rise to unacceptable levels over time. Thus, copper is an unacceptable cell contact surface for electrically connecting a condition indicator thereto.

EXAMPLE 5

A dab 15 of the same adhesive in composition and amount as described in Example 1 is prepared and applied to bulge 13 of end cap 10. However, bulge 13 and end cap 10 are composed of brass. The adhesive in this example is applied to the bulge 13 of cell 2. The adhesive is dried and the free end 23 of indicator 8 is manually pressed onto dab 15 as described in Example 1. A film 80 of polyvinylchloride which may form the label of a commercial cell is wrapped around the exposed surface of indicator 8 and a hot platen is applied as in Example 1, whereupon dab 15 immediately tackifies and bonds resistive layer 30 to end cap 10. As dab 15 cools an adhesive bond of at least 100 psi is developed. Initially the total resistance of the bond (including interfacial resistance) measures as about 0.01 ohms using a four point resistive bridge with a test current of 1 amp.

The adhesive bond is subjected to the same environmental test as described in Example 1. The bond's total resistance did not rise above 0.02 ohms at any time during the test. Although the bond's resistance remains below the required 0.1 ohm level, the copper brass contact surface of this example gradually tarnishes when exposed to a harsh urban environment containing $H_2S$ and $SO_2$ gases. The tarnishing detracts from the aesthetic appearance of the cell and can cause the total bond resistance to rise to unacceptable levels over time. Thus, copper is an unacceptable cell contact surface for electrically connecting a condition indicator thereto.

EXAMPLE 6

A dab 15 of the same adhesive in composition and amount as described in Example 1 is prepared and applied to bulge 13 of end cap 10. However, bulge 13 and end cap 10 are composed of steel plated with copper and a layer of tin plated over the copper. The adhesive in this example is applied to the bulge 13 so that it contacts the tin layer. The adhesive is dried and the free end 23 of indicator 8 is manually pressed onto dab 15 as described in Example 1. A film 80 of polyvinylchloride which may form the label of a commercial cell is wrapped around the exposed surface of indicator 8 and a hot platen is applied as in Example 1, whereupon dab 15 immediately tackifies and bonds resistive layer 30 to end cap 10. As dab 15 cools an adhesive bond of at least 100 psi is developed. Initially the total resistance of the bond (including interfacial resistance) measures as about 0.004 ohms using a four point resistive bridge with a test current of 1 amp.

The adhesive bond is subjected to the same environmental test as described in Example 1. The bond's total resistance did not rise above 0.006 ohms at any time during the test. Additionally, the tin contact surface employed in this example does not tarnish when exposed over time to harsh urban atmospheres containing $SO_2$ and/or $H_2S$ gaseous impurities. Thus, tin provides a highly desirable cell contact surface for electrically connecting a condition indicator thereto.

EXAMPLE 7

A dab 15 of the same adhesive in composition and amount as described in Example 1 is prepared and applied to bulge 13 of end cap 10. However, bulge 13 and end cap 10 are composed of steel plated with tin. The adhesive in this example is applied to the bulge 13 so that it contacts the tin layer. The adhesive is dried and the free end 23 of indicator 8 is manually pressed onto dab 15 as described in Example 1. A film 80 of polyvinylchloride which may form the label of a commercial cell is wrapped around the exposed surface of indicator 8 and a hot platen is applied as in Example 1, whereupon dab 15 immediately tackifies and bonds resistive layer 30 to end cap 10. As dab 15 cools an adhesive bond of at least 100 psi is developed. Initially the total resistance of the bond (including interfacial resistance) measures as about 0.004 ohms using a four point resistive bridge with a test current of 1 amp.

The adhesive bond is subjected to the same environmental test as described in Example 1. The bond's total resistance did not rise above 0.01 ohms at any time during the test. Additionally, the tin contact surface employed in this example does not tarnish when left exposed to harsh urban atmospheres containing $SO_2$ and/or $H_2S$ gaseous impurities. This again indicates that tin provides a highly desirable cell contact surface for electrically connecting a condition indicator thereto.

EXAMPLE 8

A conductive thermosetting adhesive is prepared by first forming Part A by adding the monomers listed in Table 2 to a conventional mixer. The monomers are added to the mixer in the percent by weight given in Table 2. All other components are added in the percent by weight shown in Table 2. The mixture is stirred under ambient conditions until homogeneity is achieved. Then the SILFLAKES 135 is mixed in followed by the t-butyl perbenzoate catalyst. Mixing is continued. When homogeneity is obtained, the CAB-O-SIL fumed silica is added and blended in until the mixture thickens to a homogeneous thixotropic paste (Part A).

When it is desired to apply the adhesive, the Part A mixture is applied as dab 15 to bulge 13 of end cap 10 (1 sq. mm in area and 2 mil (0.05 mm) thick). End cap 10 and bulge 13 are of tin plated steel and Part A contacts the tin plate. Part B, which is low viscosity crosslinking activator VANAX 808, is applied as dab 18 (1 sq. mm) to the underside of resistive layer 30. (Conversely, Part A may be applied as dab 18 and Part B as 15.) In this example dab 15 and 18 are applied covering about 1 sq. mm surface area using a syringe pump applicator. The two coated surfaces are then pressed together using only moderate pressure whereupon the adhesive is formed and sets in about 1 to 2 minutes. The set adhesive has a thickness of about 2 mils (0.05 mm) and covers a surface area of about 1 sq.mm. Full bonding strength is obtained in about 24 hours. At this time a bond strength of at least 50 psi (specifically, 60–70 psi as measured by the ASTM 3528 method) develops between end cap 10 and resistive layer 30.

Initially the adhesive has a measured total resistance (including interfacial resistance) of 0.001 to 0.01 ohms. The adhesive bond is subjected to the same environmental test as described in Example 1. Upon storage for one month at 60° C. and 100% relative humidity, the total resistance of the bond remains below 0.1 ohm, thus indicating that a tin plated steel is an acceptable surface for electrically connecting a condition indicator to a cell using a conductive thermoset adhesive.

The bond resistances obtained with various cell contact metals are summarized in the following Table 3. (Unless otherwise indicated, the conductive adhesive composition and amount employed in each case is the same as described in Example 1):

TABLE 3

| Cell Contact Surface | Initial Bond Resistance, Ohm | Bond Resist, ohm After One Month at 60° C. and 100% Rel. Humidty | Tarnishing Due To Exposure To $H_2S$ and $SO_2$ in Air |
|---|---|---|---|
| Nickel on Steel | 0.05 | >0.1 | No |
| Nickel on Steel[1] | <0.1 | >0.1 | No |
| Cobalt | 0.03 | >0.1 | No |
| Silver | <0.001 | <0.001 | Yes |
| Silver on Copper on Steel | <0.001 | <0.001 | Yes |
| Copper | 0.001 | 0.002 | Yes |
| Copper on Steel | 0.001 | 0.002 | Yes |
| Brass | 0.01 | 0.02 | Yes |
| Tin | 0.002 | 0.002 | No |
| Tin on Copper on Steel | 0.004 | 0.006 | No |
| Tin on Steel | 0.004 | 0.01 | No |
| Tin on Steel[2] | <0.01 | <.1 | No |

Notes:
[1]Conductive thermosetting adhesive as in Example 2.
[2]Conductive thermosetting adhesive as in Example 8.

The specific adhesive formulations described in the Tables and in the preceding examples may be used in bonding metal bearing substrates together as in end cap 10 and resistive layer 30. However, the adhesive is not limited to bonding metallic substrates, but may also be used in bonding conductive polymeric films or for bonding metallic substrates and conductive polymeric films.

Although the present invention has been described with respect to specific embodiments it should be appreciated that other embodiments are possible without departing from the concept of the invention. For example, the alkaline cell employed is merely illustrative of a conventional cell to which the indicator may be bonded using the conductive adhesive. Any other conventional cell may also be used. The conductive adhesive having the above described properties, may be useful in bonding indicators other than thermochromic indicators to either the cell end cap or casing. Accordingly, the invention is not intended to be limited to the specific embodiments, but rather is defined by the claims and equivalents thereof.

What is claimed is:

1. In combination, an alkaline electrochemical cell having negative and positive terminals; a cell condition indicator comprising a multilayered structure including an electrically resistive layer; an electrically conductive adhesive contacting and permanently electrically connecting a portion of said electrically resistive layer of said cell indicator to a portion of one of said terminals; said conductive adhesive having a resistivity of less than $2.0 \times 10^{-4}$ ohm-m; and wherein the portion of said cell terminal which the conductive adhesive contacts comprises tin.

2. The combination of claim 1 wherein the portion of said cell terminal which the conductive adhesive contacts comprises steel plated with tin, and wherein said conductive adhesive contacts the tin.

3. The combination of claim 1 wherein the conductive adhesive has a resistivity of between about $2.0 \times 10^{-5}$ ohm-m and $2.0 \times 10^{-4}$ ohm-m.

4. The combination of claim 1 wherein the total resistance of the adhesive, including the interfacial resistance between the conductive adhesive and the portion of the terminal which said adhesive contacts, is less than 0.1 ohm.

5. The combination of claim 4 wherein said total resistance is less than 0.1 ohm even when said adhesive bonded to said portion of the terminal is exposed to atomspheric air at a temperature of 60° C. for one month at 100% relative humidity.

6. The combination of claim 1 wherein the condition indicator comprises a thermochromic layer and said electrically resistive layer comprises silver.

7. The combination of claim 6 wherein the conductive adhesive bonds a portion of said resistive layer to the negative terminal of said cell.

8. The combination of claim 1 wherein said cell condition indicator has a thickness of less than 100 mils (2.5 mm).

9. The combination of claim 1 wherein said cell condition indicator has a thickness between about 4 and 15 mils (0.1 and 0.38 mm).

10. The combination of claim 1 wherein the conductive adhesive comprises electrically conductive particles comprising silver.

11. The combination of claim 10 wherein the particles have an average diameter to thickness ratio between about 10 and 1000, and wherein said particles comprise between 40 and 90 percent by weight of the adhesive (dry basis).

12. The combination of claim 10 wherein the electrically conductive particles comprises particulate substrates plated with silver, said silver plated particles having an average diameter to thickness ratio between 10 and 1000.

13. The combination of claim 1 wherein the conductive adhesive comprises a material selected from the group consisting of a heat activatable polyesterpolyurethane copolymer, and a thermosetting adhesive comprising at least one acrylate monomer.

* * * * *